United States Patent
Gal-Or et al.

(10) Patent No.: US 10,341,234 B2
(45) Date of Patent: Jul. 2, 2019

(54) METHOD, COMPUTING DEVICE AND SYSTEM FOR INVOKING SOFTWARE APPLICATION METHODS OF REMOTE JAVA OBJECTS

(71) Applicant: Huawei Technologies Co., Ltd., Shenzhen (CN)

(72) Inventors: Eshed Gal-Or, Munich (DE); Hayim Porat, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 396 days.

(21) Appl. No.: 15/147,681

(22) Filed: May 5, 2016

(65) Prior Publication Data
US 2016/0248681 A1 Aug. 25, 2016

Related U.S. Application Data

(63) Continuation of application No. PCT/EP2014/065995, filed on Jul. 25, 2014.

(51) Int. Cl.
G06F 15/16 (2006.01)
H04L 12/803 (2013.01)
(Continued)

(52) U.S. Cl.
CPC ........... *H04L 47/125* (2013.01); *G06F 9/505* (2013.01); *G06F 9/5072* (2013.01); *G06F 9/548* (2013.01);
(Continued)

(58) Field of Classification Search
CPC ... H04L 47/125; H04L 67/42; H04L 67/1002; G06F 9/505; G06F 9/548; G06F 9/5072; G06F 2209/542; G06F 2209/5015
(Continued)

(56) References Cited

U.S. PATENT DOCUMENTS

| | | | |
|---|---|---|---|
| 6,950,848 B1* | 9/2005 | Yousefi'zadeh | G06F 9/50 707/999.01 |
| 8,122,070 B1* | 2/2012 | Eshkenazi | G06F 17/30011 707/822 |

(Continued)

FOREIGN PATENT DOCUMENTS

| | | |
|---|---|---|
| CN | 101014044 A | 8/2007 |
| CN | 103051629 A | 4/2013 |

(Continued)

OTHER PUBLICATIONS

Schnekenburger, T., et al., "Load Balancing in CORBA: A Survey of Concepts, Patterns, and Techniques," XP000970003, The Journal of Supercomputing, vol. 15, Issue 2, Feb. 2000, pp. 141-161.

(Continued)

*Primary Examiner* — Farzana B Huq
(74) *Attorney, Agent, or Firm* — Conley Rose, P.C.

(57) ABSTRACT

A method, system, and computing device configured for invoking software application methods of remote JAVA objects are provided. Therein, a client sends at least one remote JAVA application object request to at least one of a plurality of JAVA application server instances. A software defined network (SDN) application located in the network path between the client and the plurality of JAVA application server instances receives the remote JAVA application object request, and forwards the remote JAVA application object request to the plurality of JAVA application server instances. Then, the SDN application generates at least one remote JAVA application object pool based on object references in response to the at least one forwarded remote JAVA application object request. When the SDN application receives a JAVA application method invocation request sent it delegates the remote JAVA application method invocation request to one or more of the plurality of JAVA application server instances.

13 Claims, 5 Drawing Sheets

(51) Int. Cl.
*G06F 9/50* (2006.01)
*G06F 9/54* (2006.01)
*H04L 29/08* (2006.01)
*H04L 29/06* (2006.01)

(52) U.S. Cl.
CPC .......... *H04L 67/1002* (2013.01); *H04L 67/42* (2013.01); *G06F 2209/5015* (2013.01); *G06F 2209/542* (2013.01)

(58) Field of Classification Search
USPC ................................ 709/219, 223, 224, 238
See application file for complete search history.

(56) References Cited

U.S. PATENT DOCUMENTS

| 2003/0014469 | A1 | 1/2003 | Ramaswamy et al. |
| 2003/0195996 | A1* | 10/2003 | Jacobs .................... G06F 9/465 719/313 |
| 2007/0038994 | A1* | 2/2007 | Davis ................. H04L 63/0227 717/174 |

FOREIGN PATENT DOCUMENTS

| CN | 103368864 A | 10/2013 |
| EP | 2765751 B1 | 7/2013 |

OTHER PUBLICATIONS

Chen, C., et al., "Switching Supports for Stateful Object Remoting on Network Processors," XP019508733, The Journal of Supercomputing, Kluwer Academic Publishers, vol. 40, No. 3, Mar. 9, 2007, 7 pages.
Bartlett, G., et al., "Understanding Passive and Active Service Discovery," XP055139919, Proceedings of the 7th ACM Sigcomm Conference on Internet Measurement, IMC, Oct. 24-26, 2007, 14 pages.
Foreign Communication From a Counterpart Application, PCT Application No. PCT/EP2014/065995, International Search Report dated Oct. 2, 2014, 5 pages.
Foreign Communication From a Counterpart Application, PCT Application No. PCT/EP2014/065995, Written Opinion dated Oct. 2, 2014, 6 pages.
Machine Translation and Abstract of Chinese Publication No. CN101014044, Aug. 8, 2007, 10 pages.
Machine Translation and Abstract of Chinese Publication No. CN103368864, Oct. 23, 2013, 9 pages.
Foreign Communication From a Counterpart Application, Chinese Application No. 201480080677.9, Chinese Office Action dated May 7, 2019, 6 pages.
Foreign Communication From a Counterpart Application, Chinese Application No. 201480080677.9, Chinese Search Report dated Apr. 26, 2019, 2 pages.

* cited by examiner

METHOD, COMPUTING DEVICE AND SYSTEM FOR INVOKING SOFTWARE APPLICATION METHODS OF REMOTE JAVA OBJECTS

CROSS-REFERENCE TO RELATED APPLICATIONS

This application is a continuation of International Application No. PCT/EP2014/065995, filed on Jul. 25, 2014, which is hereby incorporated by reference in its entirety.

TECHNICAL FIELD

The present disclosure relates to a method, a computing device and a system for invoking software application methods of remote JAVA objects. In particular, the present disclosure provides transparent load-balancing to JAVA remote method invocation by using a software-defined network (SDN) application. The present disclosure particularly utilizes an SDN application in the network path between clients and server instances, the SDN application functioning as proxy for invoking remote JAVA application methods.

BACKGROUND

In the area of enterprise applications based on JAVA Enterprise Edition (JEE), it is common practice to use the JAVA Remote Method Invocation (RMI) protocol, when a client (or a client application) intends to converse with a server (or multiple server instances). JAVA RMI is an enterprise technology, well entrenched in the enterprise information technology (IT) software industry.

The JAVA RMI protocol is based on the Common Object Request Broker Architecture (CORBA), and in most cases it will use its Internet Inter-ORB Protocol (IIOP) to marshal JAVA objects between a client and a server instance using a Transmission Control Protocol (TCP)/Internet Protocol (IP) connection.

However popular it is, JAVA RMI also poses limitations. In particular, client applications cannot achieve load-balancing without addressing it specifically in their code. However, in most cases where load-balancing is required, a customer (who owns the client and server applications) does not have access to modify the client software, and in many cases does not even have the server code. That means, if the client software was not originally created to include load-balancing of specific server components/services, there is no external "off-the-shelf" solution available to change it.

In many cases, the customer—e.g. an enterprise company that uses IT systems to manage its business processes—does not possess the skill, the manpower and/or the requirements to modify the systems. At the present, the customer must rely heavily on off-the-shelf, field-programmable equipment, in order to provide means to manage the likes of availability, scalability, resilience, load balancing, and so on and so forth.

The typical prior art JEE RMI flow in a typical prior art system 500 is depicted in FIG. 5, and contains internal software facilities to manage load balancing. However, unless all the software application components adhere to strict rules and design patterns, these internal facilities become a hindrance, and prohibit load-balancing by external means (like load-balancing appliances and application-delivery controllers).

The way JEE RMI is designed in the prior art, the only connection that can be externally load-balanced is the initial call (e.g. a remote JAVA application object request) of a client 501 to a JAVA Naming and Directory Interface (JNDI) component 505. After the initial call, an Interoperable Object Reference (IOR) is returned to the client 501, which causes the client 501 to bypass any load-balancer. In a JEE cluster architecture several server instances 502 of the JEE server/container may exist, each with its own JNDI instance 505. The JNDI instances 505 are all connected, and coordinate the allocation of an EJB Home 506 on one of the server instances 502 (i.e. provide internal load-balancing).

The classic approach of a JEE client-server reaction model is that every service call (e.g. every remote JAVA application method invocation request) that a client 501 sends to the server instances 502 is an entirely new EJB request. When done like this, each new EJB request will be handled by the internal load-balancing mechanism. This approach is extremely wasteful in system resources, and yields poor performance and user experience, especially when the user-base of the system grows, or when additional branches are added to the business, which need to communicate with the "central office", i.e. the client 501 and server instances 502 become physically more distant with noticeable latency.

In order to overcome the wastefulness of creating new objects for each remote JAVA application method invocation request, the client application needs to actively participate in the load-balancing, e.g. by requesting many IORs from the server instances 502 "in advance" (i.e. creating a pool of objects), and then to run on them in some load-balanced manner (e.g. using round-robin). However, this approach requires that the client software is designed in a certain way, and it is not possible to impose this solution on to existing client software.

Attempts at resolving this problem have been tried by many companies for many years with limited success. Most notably, JEE Application Server vendors created proprietary software solutions that run as a gateway between client 501 calls and the server instances 502, and carry out load-balancing. However, these solutions are hard to configure, maintain, and operate, and have terrible performance impact. Moreover, said solutions are expensive, because additional processing power and software licenses are needed. These solutions can also not be considered "production-grade", in terms of reliability.

Other workarounds move from JEE to Hypertext Transfer Protocol (HTTP) communication between client and server instances, which can easily be load-balanced. This approach, however, comes with its own set of drawbacks, such as a much slower and byte-heavy communication (especially notable when the client and server instances are separated by a Wide-Area Network (WAN)), as well as computational overhead, which is expressed in additional resources, power and latency, both on the client and the server side.

SUMMARY

In view of the above-mentioned disadvantages and problems, the present disclosure aims to improve the state of the art. In particular, the object of the present disclosure is to provide a novel solution to handle remote JAVA application object requests of one or more clients, which is transparent to both the clients and to the server instances. In particular, the solution should be easy to configure to include load-balancing or other server components/services. The solution, however, intends to avoid any client code/software changes and/or optimization, in order to support load-balancing or other services. Moreover, the solution shall also not require any modification to the existing configuration and/or behavior of server instances. Overall, the present disclosure aims to improve the performance of e.g. enterprise IT systems.

The above-mentioned object of the present disclosure is achieved by the solution provided in the enclosed independent claims. Advantageous implementations of the present disclosure are further defined in the respective dependent claims. In particular, the core idea of the present disclosure is to forward an initial object request of a client to an SDN application that generates and manages a "pool" of RMI objects. For example, the proposed disclosure may take a similar approach as a "Floating-IP based" load-balancer towards the client, by hijacking the initial object request, which the client actually intends to send to a server instance, for example, by using an SDN switch.

A first aspect of the present disclosure provides a method for invoking software application methods of remote JAVA objects comprising sending, by a client, at least one remote JAVA application object request to at least one of a plurality of JAVA application server instances; receiving, by an SDN application located in the network path between the client and the plurality of JAVA application server instances, the at least one remote JAVA application object request; forwarding, by the SDN application, the at least one remote JAVA application object request to the plurality of JAVA application server instances; generating, by the SDN application, at least one remote JAVA application object pool based on object references received from the plurality of JAVA application server instances in response to the at least one forwarded remote JAVA application object request; receiving, by the SDN application, at least one remote JAVA application method invocation request sent by the client associated with the at least one remote JAVA application object request; and delegating, by the SDN application, the at least one remote JAVA application method invocation request to one or more of the plurality of JAVA application server instances.

The SDN application is a software component, which may be registered on an SDN controller running on some computing device. The SDN application is configured to implement the interaction towards the server instances by generating the remote JAVA application object pool. Thereby, it is, for example, possible for the SDN application to use the remote JAVA application object request requests, i.e. forward them to the server instances, in a load-balanced manner (e.g. by using a round-robin). By using the SDN application, a novel solution for handling remote JAVA application object requests of clients is created, which is transparent to the at least one client and to the plurality server instances. The SDN application allows an easy configuration by the customer, for instance, to include load-balancing or other server components/services. Since the SDN application manages the JAVA application object pool and delegates all JAVA application object request to the plurality of server instances, load-balancing may be simply and efficiently implemented. Since load-balancing can be achieved by means of the SDN application, which acts as a proxy between the at least one client and the server instances, the client code/software does not need to be changed. Also the configuration and/or behavior of the server instances do not have to be touched. The first aspect of the present disclosure thus makes it possible to tremendously improve performance of enterprise IT systems, without any special skills, and without any modifications to client or server software.

In a first implementation form of the method according to the first aspect, delegating the at least one remote JAVA application method invocation request by the SDN application to the plurality of JAVA application server instances comprises delegating remote JAVA application method invocation requests on stateless or idempotent remote JAVA application object instances to one or more arbitrary JAVA application server instances in a load-balanced manner, and sending remote JAVA application method invocation requests on stateful or non-idempotent remote JAVA application object instances to the requested JAVA application server instances.

By the delegating procedure according to the first implementation form, load-balancing may be provided when invoking software application methods of remote JAVA objects. Thereby, one of the main drawbacks of JAVA RMI is addressed in a simple and efficient manner. Now, not only the remote JAVA application object request (i.e. the initial call to the JNDI component used of the prior art) may be load-balance, but also remote JAVA application method invocation requests (i.e. the subsequent service calls being treated as new EJB requests in the prior art). Due to the ability of the method to distinguish between calls on stateless or idempotent remote JAVA application object instances and stateful or non-idempotent remote JAVA application object instances, respectively, integration with existing client and server solutions is fully enabled.

In a second implementation form of the method according to the first implementation form of the first aspect, delegating remote JAVA application method invocation requests on stateless or idempotent remote JAVA application object instances comprises weighting the remote JAVA application method invocation requests; delegating the remote JAVA application method invocation requests based on a measured load of the plurality of JAVA application server instances; or delegating the remote JAVA application method invocation requests based on a round-robin algorithm.

The alternatives of the second implementation form allow an efficient load-balancing of remote JAVA application method invocation requests.

In a third implementation form of the method according to the first aspect as such or any implementation forms of the first aspect, generating the at least one remote JAVA application object pool comprises receiving, by the SDN application, at least one interoperable object reference, IOR, from one or more of the plurality of JAVA application server instances in response to the at least one forwarded remote JAVA application object request; and storing the at least one IOR in association with an identification key of the at least one client.

By associating the IORs with the identification key of the client, the SDN application receiving a remote JAVA application method invocation request sent by the client may know, for which remote JAVA application object pool to delegate the request. In this way, also session stickiness and/or failover for the at least one remote JAVA application method invocation request can be provided when one or more JAVA application server instances becomes unresponsive. Thereby, high availability requirements can be met.

In a fourth implementation form of the method according to the first aspect as such or any implementation forms of the first aspect, the method further comprises, upon a request of the at least one client to release an object, terminating, by the SDN application, the object references associated with the client and the object in the remote JAVA application object pool; and sending a termination result to the client.

In a fifth implementation form of the method according to the first aspect as such or any implementation forms of the first aspect, the method further comprises providing, by the SDN application, the client with a fictitious IOR, and associating, by the SDN application, a remote JAVA application method invocation request sent by the client with a remote JAVA application object pool based on information contained in the fictitious IOR.

Since the client receives a fictitious IOR, it is not aware of any changes compared to a method for invoking software application methods of remote JAVA objects according to the prior art. The client is not aware of the fact that it communicates in reality with the SDN application, and not the server instances. Thus, the SDN application and all services, like load-balancing, are transparent from the client point of view. As a consequence, it is possible to use existing clients and client applications, without making any modifications to its code/software.

In a sixth implementation form of the method according to the fifth implementation form of the first aspect, the method further comprises generating, by the SDN application, the fictitious IOR by duplicating an IOR received from one or more of the plurality of JAVA application server instances; and replacing at least address information and port information in the duplicated IOR.

The sixth implementation form provides a fast and efficient way to create fictitious IORs, which the client is unaware of.

In a seventh implementation form of the method according to the first aspect as such or any implementation forms of the first aspect, the method further comprises intercepting, by an SDN switch located in the network path between the client and the plurality of JAVA application server instances, the at least one remote JAVA application object request sent by the client, and sending, by the SDN switch, the at least one remote JAVA application object request to the SDN application according to a first forwarding rule.

That means, in order to place itself between the at least one client and the one or more server instances, the SDN application utilizes an SDN Switch (e.g. an OpenVSwitch) and preferably and OpenFlow control protocol, e.g. for creating a forwarding rule when the client attempts to open a new RMI session with a server instance. The SDN switch may be a readily-available, commercial (hardware or software) or open-sourced software component, which preferably supports the OpenFlow control protocol. The SDN switch is therefore a solution that is inexpensive and easy to configure. The SDN switch resides in the network path of the route from the clients to the server instances. The SDN switch is responsible for forwarding all RMI protocol data units sent from the clients. By utilizing the OpenFlow control capabilities in the SDN switch, the switch may be programmed to forward RMI packets from the client to the SDN application, instead of to the server instances.

In an eight implementation form of the method according to the seventh implementation form of the first aspect, the method further comprises using, by the client, at least one floating IP address and port as a sending destination for the at least one remote JAVA application object request; and sending, by the SDN switch, all data traffic destined towards the floating IP address and port to the SDN application.

The use of floating IP addresses and ports provides an easy and efficient way to highjack one remote JAVA application object requests and remote JAVA application method invocation requests sent by the client, and divert them to the SDN application. The use of more than one IP address and port supports high availability requirements.

In a ninth implementation form of the method according to the seventh or the eighth implementation forms of the first aspect, the method further comprises sending, by the SDN switch, a remote JAVA application method invocation request sent by the client to the SDN application according to a second forwarding rule generated based on the fictitious IOR.

Since forwarding rule is based on the fictitious IOR, the client is not aware of any changes in view of the prior art protocol. Therefore, existing clients can be used for the method of the present disclosure.

In a tenth implementation form of the method according to the first aspect as such or any implementation forms of the first aspect, the method comprises providing, by the SDN application, session stickiness and/or failover for the at least one remote JAVA application method invocation request of the client when one or more JAVA application server instances becomes unresponsive.

In an eleventh implementation form of the method according to the first aspect as such or any implementation forms of the first aspect, forwarding the at least one remote JAVA application object request to the plurality of JAVA application server instances comprises simulating, by the SDN application, a functionality of a JAVA naming and directory interface, JNDI, by delegating the at least one remote JAVA application object request to a list of JNDIs of the plurality of JAVA application server instances.

The SDN application thus acts as a transparent JDNI proxy. Both the client side and the server side are not aware of any changes, i.e. of any proxy. Thus, the method of the present disclosure functions without any changes to the client software or configuration, or the behavior and/or configuration of the server instances.

In a twelfth implementation form of the method according to the first aspect as such or any implementation forms of the first aspect, the method further comprises utilizing, by the SDN application and the SDN switch an OpenFlow protocol.

A second aspect of the present disclosure provides a computing device configured to run an SDN application, wherein the computing device is connectable in the network path between a client and a plurality of JAVA application server instances, and wherein the SDN application is configured to receive at least one remote JAVA application object requests sent by the client, forward the at least one remote JAVA application object request to the plurality of JAVA application server instances; generate at least one remote JAVA application object pool based on object references received from the plurality of JAVA application server instances in response to the at least one remote JAVA application object request; receive at least one remote JAVA application method invocation request sent by the client associated with the at least one remote JAVA application object request; and delegate the at least one remote JAVA application method invocation request to one or more of the plurality of JAVA application server instances.

In a first implementation form of the computing device according to the second aspect, delegating the at least one remote JAVA application method invocation request by the SDN application to the plurality of JAVA application server instances comprises delegating remote JAVA application method invocation requests on stateless or idempotent remote JAVA application object instances to one or more arbitrary JAVA application server instances in a load-balanced manner, and sending remote JAVA application method invocation requests on stateful or non-idempotent remote JAVA application object instances to the requested JAVA application server instances.

In a second implementation form of the computing device according to the first implementation form of the second aspect, delegating remote JAVA application method invocation requests on stateless or idempotent remote JAVA application object instances comprises weighting the remote JAVA application method invocation requests; delegating the remote JAVA application method invocation requests based on a measured load of the plurality of JAVA application server instances; or delegating the remote JAVA application method invocation requests based on a round-robin algorithm.

In a third implementation form of the computing device according to the second aspect as such or any implementation forms of the second aspect, generating the at least one remote JAVA application object pool comprises receiving, by the SDN application, at least one IOR from one or more of the plurality of JAVA application server instances in response to the at least one forwarded remote JAVA application object request; and storing the at least one IOR in association with an identification key of the at least one client.

In a fourth implementation form of the computing device according to the second aspect as such or any implementation forms of the second aspect, the computing device is further configured, upon a request of the at least one client to release an object terminate, by the SDN application, the object references associated with the client and the object in the remote JAVA application object pool; and send a termination result to the client.

In a fifth implementation form of the computing device according to the second aspect as such or any implementation forms of the second aspect, the computing device is further configured to provide, by the SDN application, the client with a fictitious IOR, and associate, by the SDN application, a remote JAVA application method invocation request sent by the client with a remote JAVA application object pool based on information contained in the fictitious IOR.

In a sixth implementation form of the computing device according to the fifth implementation form of the second aspect, the computing device is further configured to generate, by the SDN application, the fictitious IOR by duplicating an IOR received from one or more of the plurality of JAVA application server instances; and replace at least address information and port information in the duplicated IOR.

In a seventh implementation form of the computing device according to the second aspect as such or any implementation forms of the second aspect, the computing device is further configured to provide, by the SDN application, session stickiness and/or failover for the at least one remote JAVA application method invocation request of the client when one or more JAVA application server instances becomes unresponsive.

In an eighth implementation form of the computing device according to the second aspect as such or any implementation forms of the second aspect, forwarding the at least one remote JAVA application object request to the plurality of JAVA application server instances comprises simulating, by the SDN application, a functionality of a JAVA naming and directory interface, JNDI, by delegating the at least one remote JAVA application object request to a list of JNDIs of the plurality of JAVA application server instances.

In a ninth implementation form of the computing device according to the second aspect as such or any implementation forms of the second aspect, the computing device further comprises utilizing, by the SDN application an OpenFlow protocol.

The above-described implementation forms of the second aspect provide the same advantages as mentioned regarding the implementation forms of the first aspect.

A third aspect of the present disclosure provides a system for invoking methods of remote JAVA application objects comprising a client and a plurality of JAVA application server instances; an SDN application in the network path between the client and the plurality of JAVA application server instances; wherein the SDN application is configured to receive at least one remote JAVA application object requests sent by the client, forward the at least one remote JAVA application object request to the plurality of JAVA application server instances; generate at least one remote JAVA application object pool based on object references received from the plurality of JAVA application server instances in response to the at least one remote JAVA application object request; receive at least one remote JAVA application method invocation request sent by the client associated with the at least one remote JAVA application object request; and delegate the at least one remote JAVA application method invocation request to one or more of the plurality of JAVA application server instances.

In a first implementation form of the system according to the third aspect, delegating the at least one remote JAVA application method invocation request by the SDN application to the plurality of JAVA application server instances comprises delegating remote JAVA application method invocation requests on stateless or idempotent remote JAVA application object instances to one or more arbitrary JAVA application server instances in a load-balanced manner, and sending remote JAVA application method invocation requests on stateful or non-idempotent remote JAVA application object instances to the requested JAVA application server instances.

In a second implementation form of the system according to the first implementation form of the third aspect, delegating remote JAVA application method invocation requests on stateless or idempotent remote JAVA application object instances comprises weighting the remote JAVA application method invocation requests; delegating the remote JAVA application method invocation requests based on a measured load of the plurality of JAVA application server instances; or delegating the remote JAVA application method invocation requests based on a round-robin algorithm.

In a third implementation form of the system according to the third aspect as such or any implementation forms of the third aspect, generating the at least one remote JAVA application object pool comprises receiving, by the SDN application, at least one IOR from one or more of the plurality of JAVA application server instances in response to the at least one forwarded remote JAVA application object request; and storing the at least one IOR in association with an identification key of the at least one client.

In a fourth implementation form of the system according to the third aspect as such or any implementation forms of the third aspect, the system is further configured upon a request of the at least one client to release an object to terminate, by the SDN application, the object references associated with the client and the object in the remote JAVA application object pool; and send a termination result to the client.

In a fifth implementation form of the system according to the third aspect as such or any implementation forms of the third aspect, the system is further configured to provide, by the SDN application, the client with a fictitious IOR, and associate, by the SDN application, a remote JAVA application method invocation request sent by the client with a remote JAVA application object pool based on information contained in the fictitious IOR.

In a sixth implementation form of the system according to the fifth implementation form of the third aspect, the system is further configured to generate, by the SDN application, the fictitious IOR by duplicating an IOR received from one or more of the plurality of JAVA application server instances; and replace at least address information and port information in the duplicated IOR.

In a seventh implementation form of the system according to the third aspect as such or any implementation forms of the third aspect, the system is further configured to intercept, by a SDN switch of the system located in the network path between the client and the plurality of JAVA application server instances, the at least one remote JAVA application object request sent by the client, and send, by the SDN switch, the at least one remote JAVA application object request to the SDN application according to a first forwarding rule.

In an eight implementation form of the system according to the seventh implementation form of the third aspect, the system is further configured to use, by the client, at least one floating IP address and port as a sending destination for the at least one remote JAVA application object request; and send, by the SDN switch, all data traffic destined towards the floating IP address and port to the SDN application.

In a ninth implementation form of the system according to the seventh or the eighth implementation forms of the third aspect, the system is further configured to send, by the SDN switch, a remote JAVA application method invocation request sent by the client to the SDN application according to a second forwarding rule generated based on the fictitious IOR.

In a tenth implementation form of the system according to the third aspect as such or any implementation forms of the third aspect, the system is further configured to provide, by the SDN application, session stickiness and/or failover for the at least one remote JAVA application method invocation request of the client when one or more JAVA application server instances becomes unresponsive.

In an eleventh implementation form of the system according to the third aspect as such or any implementation forms of the third aspect, forwarding the at least one remote JAVA application object request to the plurality of JAVA application server instances comprises simulating, by the SDN application, a functionality of a JNDI by delegating the at least one remote JAVA application object request to a list of JNDIs of the plurality of JAVA application server instances.

In a twelfth implementation form of the system according to the third aspect as such or any implementation forms of the third aspect, the system is further configured to utilize, by the DN application and the SDN switch, an OpenFlow protocol.

The above-described implementation forms of the third aspect provide the same advantages as mentioned regarding the implementation forms of the first aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings.

DESCRIPTION OF EMBODIMENTS

Figure 1:
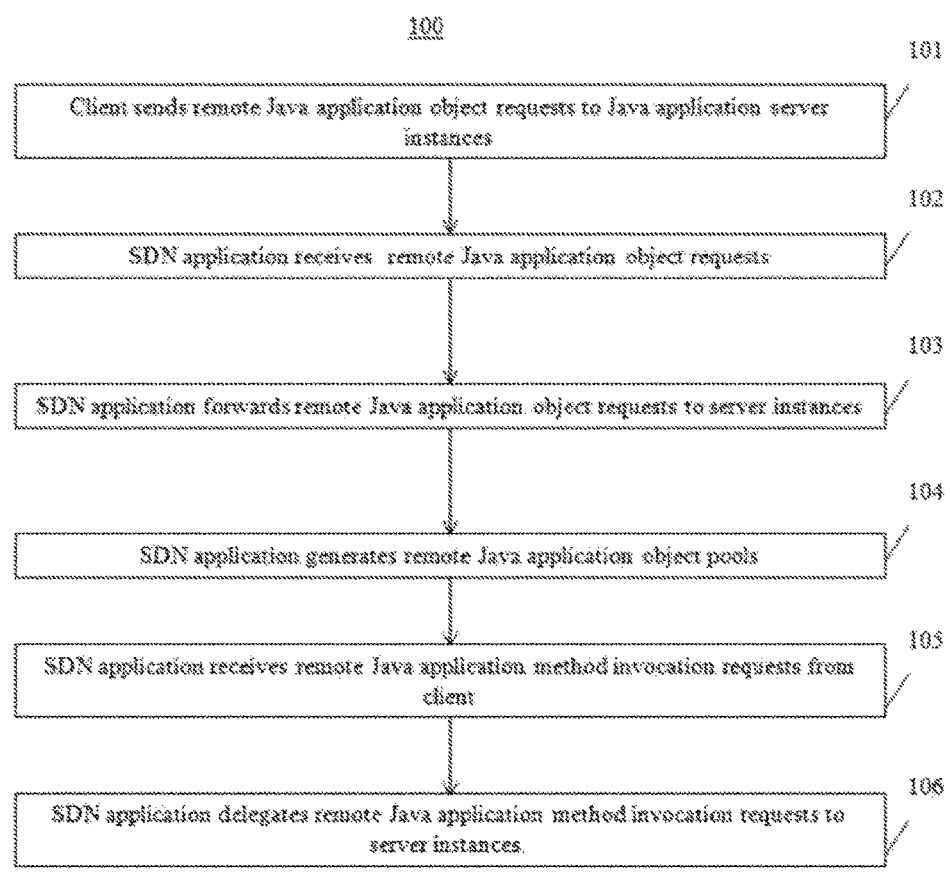
FIG. 1 shows a method according to an embodiment of the present disclosure.

FIG. 1 shows an embodiment of a method 100 according to the present disclosure. In a first step 101, a client sends at least one remote JAVA application object request to at least one of a plurality of JAVA application server instances. In a second step 102, an SDN application located in the network path between the client and the plurality of JAVA application server instances receives the at least one remote JAVA application object request. In a third step 103, the SDN application forwards the received at least one remote JAVA application object request to the plurality of JAVA application server instances. In a fourth step 104, the SDN application generates at least one remote JAVA application object pool based on object references received from the plurality of JAVA application server instances in response to the at least one forwarded remote JAVA application object request. In a fifth step 105, the SDN application receives at least one remote JAVA application method invocation request sent by the client associated with the at least one remote JAVA application object request. In a sixth step 106, the SDN application delegates the at least one remote JAVA application method invocation request to one or more of the plurality of JAVA application server instances.

Figure 2:
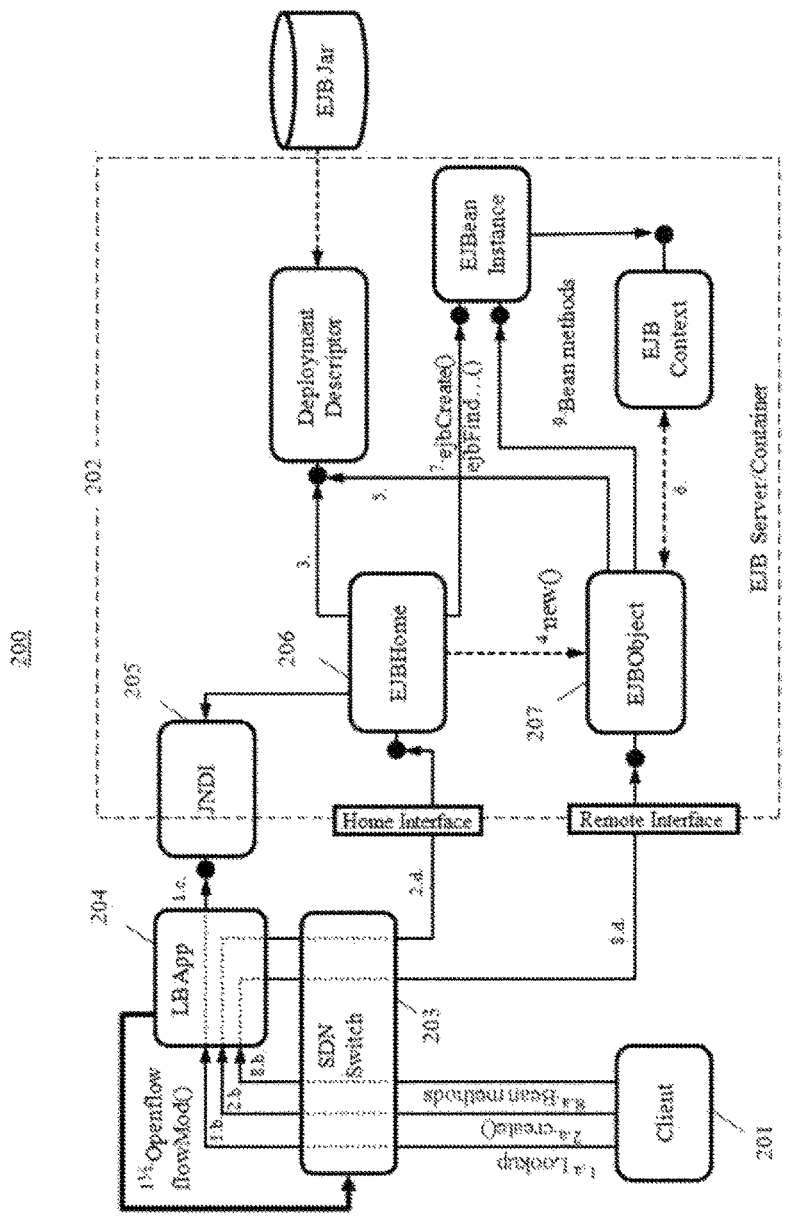
FIG. 2 shows a system according to an embodiment of the present disclosure for carrying out a method for invoking methods of remote objects according to an embodiment of the present disclosure.

FIG. 2 shows an embodiment of a system 200, which is capable of carrying out a method for invoking methods of remote JAVA objects according to the present disclosure. For example, the system 200 is capable of carrying out the method embodiment shown in FIG. 1.

Figure 5:
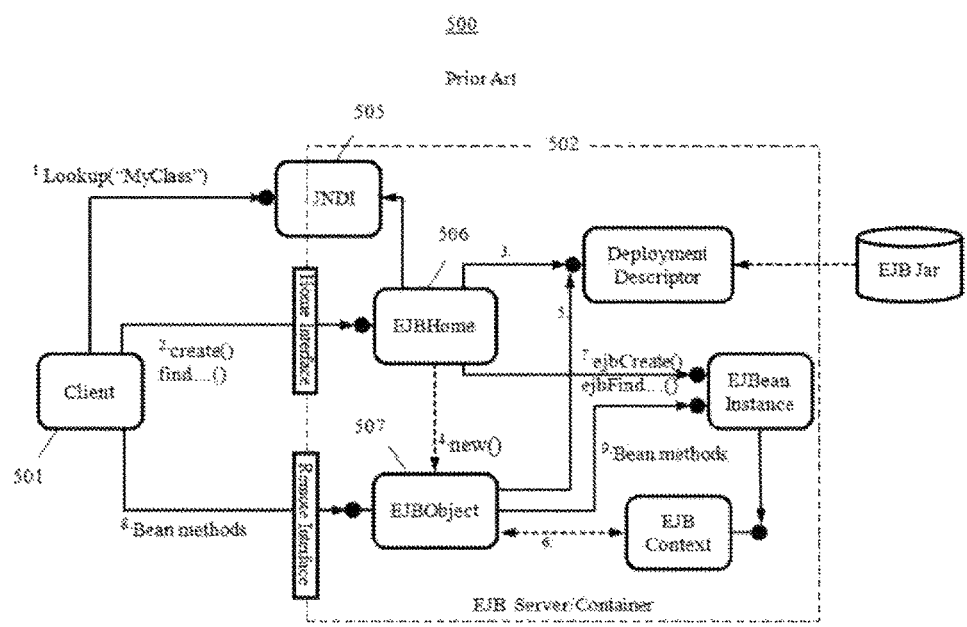
FIG. 5 shows a system of the prior art for carrying out a prior art method of invoking methods of remote objects.

In contrast to the system 500 of the prior art shown in FIG. 5, the system 200 of FIG. 2 includes an load balancing (LB) application also called SDN application 204 located in the network path between one or more clients 201 and one or more JAVA application server instances 202. The SDN application 204 is configured to receive at least one remote JAVA object request (e.g. "Lookup") from one or more clients 201, and forward the at least one object request to the one or more JAVA application server instances 202. In particular, the SDN application 204 is configured to forward the at least one remote JAVA object request to a JNDI 205 of a JAVA application server instance 202. The SDN application 204 is further configured to receive at least one subsequent remote JAVA application method invocation request (e.g. "Create" or "Bean methods") sent by the client 201, wherein the remote JAVA application method invocation request is associated with the at least one remote JAVA object request sent previously by the client 201. The SDN application 204 is then configured to delegate the at least one remote JAVA application method invocation request to one or more of the plurality of JAVA application server instances 202.

The system 200 further includes an SDN switch 203, which is located in the network path between the client 201 and the plurality of JAVA application server instances 202. The SDN switch 203 is configured to intercept the at least one remote JAVA application object request sent by the client 201, and then send the intercepted at least one remote JAVA application object request to the SDN application 204, for example, according to a forwarding rule. For instance, the client 201 may use at least one floating IP address and port as a sending destination for the at least one remote JAVA application object request, and the SDN switch 203 may be configured to send all data traffic destined towards the floating IP address and port to the SDN application 204. Furthermore, the SDN switch 203 is configured to send remote JAVA application method invocation request sent by the client 201 to the SDN application 204 according, for example, to another forwarding rule.

As in the prior art system 500 shown in FIG. 5, each one of the plurality of server instances 202 in FIG. 2 includes at least an EJBHome 206 and an EJBObject 207, which function to provide the remote JAVA objects and JAVA applications methods to the client 201 in a similar manner as in the prior art. However, interaction of the one or more server instances 202 is not directly with the client 201, but via the SDN application 204, which functions like a proxy client between the one or more clients 201 and the one or more JAVA application server instances 202.

Figure 3:
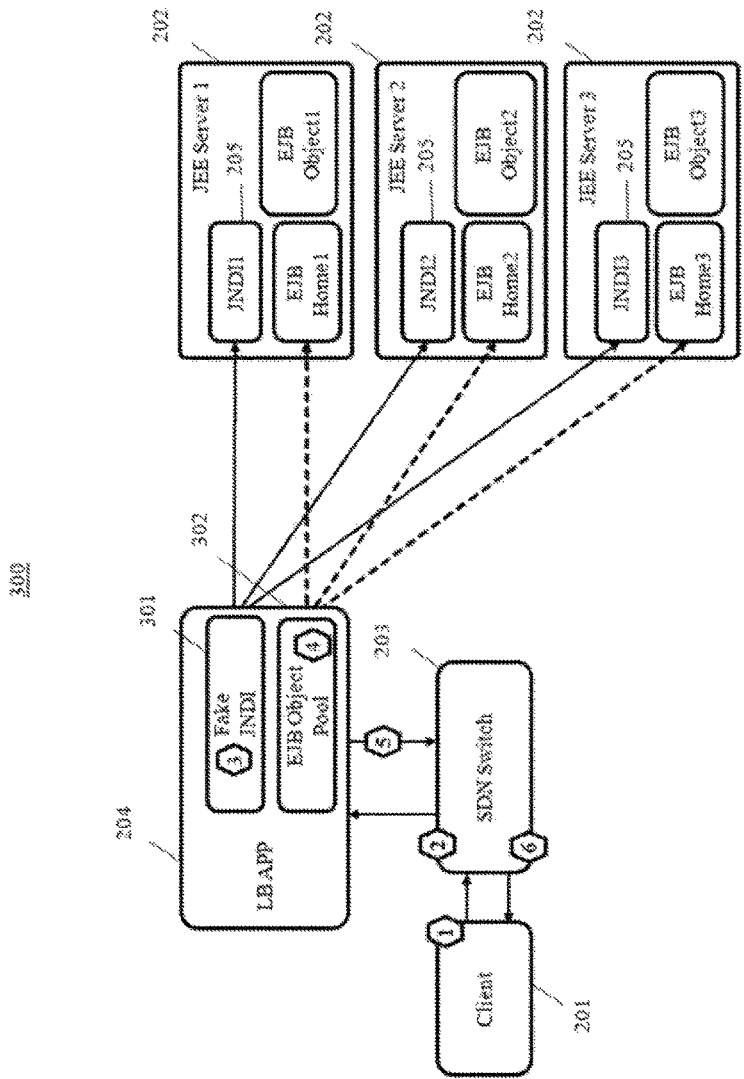
FIG. 3 shows a system according to an embodiment of the present disclosure for carrying out a method for invoking methods of remote objects according to an embodiment of the present disclosure.

FIG. 3 shows an embodiment of a system 300 for carrying out a method for invoking methods of remote JAVA objects according to the present disclosure. The system 300 of FIG. 3 is a more detailed description of the system 200 shown in FIG. 2. In particular, the following method steps may be carried out by the system 300, in order to put the proposed disclosure into practice.

At first (step 1), a "floating" IP address and a port may defined, which the at least one RMI client 201 will use for sending at least one initial remote JAVA object request. Advantageously, two or more IP addresses and ports, respectively, may be defined, in order to support JAVA RMI high-availability requirements. The IP address and port (in the following called "IP/port tuple") are given to the client 201 instead of the real address and port of the server instances 202. The IP/port tuple is preferably taken from a pre-configured range of IP/port tuples.

Then (step 2), a forwarding rule may be defined on at least one SDN switch 203 (e.g. on a OpenFlow access switch of the JAVA application server instances 202), in order to forward all ingress from known and/or permitted clients 201 (e.g. clients 201 having a certain IP address "SRC_IP") destined towards the IP/port tuple to the SDN application 204. Thereby, it is also possible to assign a wildcard, if no restrictions exist, or if restrictions are handled somewhere else. As the forwarding rule, an Openflow match rule may be created in the SDN switch 203, which is configured to forward all packets that have the IP/port tuple to the SDN application 204. The IP/port tuple may be contained in DST_IP and DST_PORT header fields, respectively, of the at least one remote JAVA object request, which is thus diverted to the SDN application 204.

The SDN application 204 is preferably registered on an SDN Controller, and is configured to receive all traffic that is destined to the IP/port tuple.

The SDN application 204 receives the at least one remote JAVA object request, and is preferably configured to simulate JNDI 301 functionality (step 3, "Fake JNDI"), namely by delegating remote JAVA object requests to a list of JNDIs 205, each of which resides on a different one of a plurality of server instances 202 (the "server pool"). In other words, the SDN application 204 handles the incoming remote JAVA object requests from the at least one client 201 as a "JNDI Proxy", forwarding it to a list of JNDIs 205 of the plurality of server instances 202.

In response to the delegated remote JAVA object requests, the SDN application 204 receives a set of IORs from all the JNDIs. Thereby, the SDN application 204 generates (step 4) at least one remote JAVA application object pool 302 based on the receiver IORs. The IORs in the remote JAVA application object pool 302 are preferably stored by the SDN application 204 in association with an identification key of the at least one client 201, for instance attached to an {SRC_IP, SRC_PORT} tuple of a respective initiating client 201.

Figure 4:
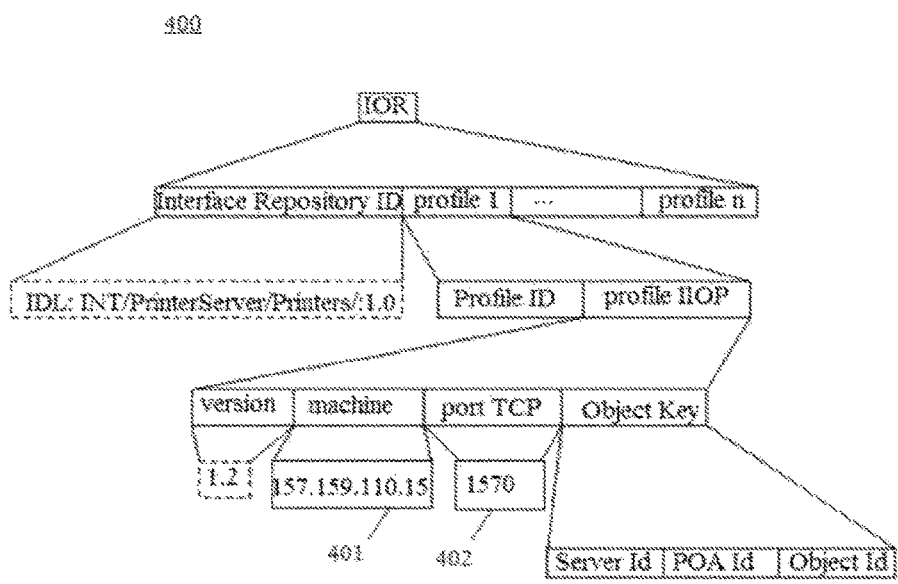
FIG. 4 shows a fictitious IOR as used by an embodiment of the present disclosure.

Preferably, the SDN application 204 returns a fictitious IOR 400 (step 5) to the client 201, for instance via the SDN switch 203. An example of a fictitious IOR 400 is shown in FIG. 4, and may contain a temporarily-unique {DST_IP, DST_PORT} tuple. The fictitious IOR 400 may particularly be generated by duplicating a (real) IOR received from one or more of the plurality of JAVA application server instances 202, and by replacing in the duplicated IOR at least an address information 401 and port information 402. As shown in FIG. 4, the fictitious IOR 400 may specifically be generated by replacing the "machine" and "port TCP" with the DST_IP and DST_PORT, which will also appear in the OpenFlow forwarding rule of the SDN switch 203.

Another forwarding rule may be set on the SDN switch 203 (e.g. using an SDN Controller). The additional forwarding rule (step 6) may match the temporarily-unique {SRC_IP, DST_IP, DST_PORT} tuple (wherein SRC_IP is the "floating" IP, and the DST_IP, DST_PORT being the "slot" allocated for that specific client request), i.e. is configured to forward all traffic from the client's {SRC_IP} to the IP/port tuple.

All subsequent remote JAVA application method invocation requests sent by the client 201 flow to SDN application 204, which is preferably configured to decide on how to forward these requests. Remote JAVA application method invocation requests on stateless or idempotent remote JAVA application object instances are preferably delegated to one or more arbitrary JAVA application server instances 202 in a load-balanced manner. Thereby, the remote JAVA application method invocation requests may be weighted, may be delegated based on a measured load of the plurality of JAVA application server instances 202, or may be delegated based on a round-robin algorithm. Remote JAVA application method invocation requests on stateful or non-idempotent remote JAVA application object instances to the requested JAVA application server instances 202, until the session is closed or rolled-back.

Upon request (of e.g. the client 201) to release an object, the SDN application 204 is configured to terminate the object references associated with the client 201 and the object in the remote JAVA application object pool 302, sending a termination result to the client 201, remove any corresponding forwarding rule on the SDN switch 203, and return the IP/port tuple to the pre-configured range it was taken from.

In an alternative embodiment, the SDN application 204 may retain the pool 302, per configuration, to accommodate client 201 applications that go up and down, in order to reduce the time and cost for re-establishment of the pool 302. This can easily be achieved, since the SRC_IP of the client 201 does not change, and the SRC_PORT is irrelevant.

The embodiments of the present disclosure make it possible to tremendously improve performance of enterprise IT systems, without any special skills, without any modifications to the client 201 or the server 202 software. Further, very high return on investment (ROI) may be achieved, while reducing ownership costs and licenses.

In particular, the present disclosure improves state of the art solutions by eliminating the load-balancer component as a single-point-of-failure, without requiring the clients 201 to be aware (e.g. upon failure of the SDN application 204, the SDN switch may forward packets to another instance of the SDN application).

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfil the functions of several entities or items recited in the claims. The mere fact that certain measures are recited in the mutual different dependent claims does not indicate that a combination of these measures cannot be used in an advantageous implementation.

What is claimed is:

1. A method for invoking a software application of remote JAVA objects comprising:
   receiving, by a software defined network (SDN) application located in a network path between a client and a plurality of JAVA application server instances, at least one remote JAVA application object request from the client;
   forwarding, by the SDN application, the at least one remote JAVA application object request to the plurality of JAVA application server instances;
   generating, by the SDN application, at least one remote JAVA application object pool based on object references received from the plurality of JAVA application server instances in response to the at least one forwarded remote JAVA application object request;
   returning the at least one remote JAVA application object pool to the client;
   receiving, by the SDN application, at least one remote JAVA application method invocation request from the client associated with the at least one remote JAVA application object request;
   delegating the at least one remote JAVA application method invocation request on stateless remote JAVA application object instances to one or more arbitrary JAVA application server instances in a load-balanced manner by:
      weighting the at least one remote JAVA application method invocation request; and
      delegating the at least one remote JAVA application method invocation request based on a measured load of the plurality of JAVA application server instances;
   sending the at least one remote JAVA application method invocation request on stateful remote JAVA application object instances to request JAVA application server instances; and
   retaining, by the SDN application, at least one remote JAVA application object pool to accommodate the at least one remote JAVA application object request.

2. The method of claim 1, wherein delegating the at least one remote JAVA application method invocation requests on stateless remote JAVA application object instances further comprises delegating the at least one remote JAVA application method invocation request based on a round-robin algorithm.

3. The method of claim 1, wherein generating the at least one remote JAVA application object pool comprises:
   receiving, by the SDN application, at least one interoperable object reference (IOR), from one or more of the plurality of JAVA application server instances in response to the at least one forwarded remote JAVA application object request; and
   storing the at least one IOR in association with an identification key of the at least one client.

4. The method of claim 1, further comprising upon a request of the at least one client to release an object:
   terminating, by the SDN application, the object references associated with the client and the object in the remote JAVA application object pool; and
   sending, by the SDN application, a termination result to the client.

5. The method of claim 1, further comprising:
   providing, by the SDN application, the client with a fictitious interoperable object reference (IOR); and
   associating, by the SDN application, the at least one remote JAVA application method invocation request from the client with the at least one remote JAVA application object pool based on information contained in the fictitious IOR.

6. The method of claim 5, further comprising:
   generating, by the SDN application, the fictitious IOR by duplicating an IOR received from one or more of the plurality of JAVA application server instances; and
   replacing at least address information and port information in a duplicated IOR.

7. The method of claim 1, further comprising:
   intercepting, by an SDN switch located in the network path between the client and the plurality of JAVA application server instances, the at least one remote JAVA application object request from the client; and
   sending, by the SDN switch, the at least one remote JAVA application object request to the SDN application according to a first forwarding rule.

8. The method of claim 7, further comprising:
   using, by the client, at least one floating internet protocol (IP) address and port as a sending destination for the at least one remote JAVA application object request; and
   sending, by the SDN switch, all data traffic destined towards the floating IP address and port to the SDN application.

9. The method of claim 7, further comprising sending, by the SDN switch, a remote JAVA application method invocation request from the client to the SDN application according to a second forwarding rule generated based on the fictitious IOR.

10. The method of claim 1, further comprising providing, by the SDN application, at least one of session stickiness and failover for the at least one remote JAVA application method invocation request of the client when the one or more JAVA application server instances become unresponsive.

11. The method of claim 1, wherein forwarding the at least one remote JAVA application object request to the plurality of JAVA application server instances comprises simulating, by the SDN application, a functionality of a JAVA naming and directory interface (JNDI), by delegating the at least one remote JAVA application object request to a list of JNDIs of the plurality of JAVA application server instances.

12. The method of claim 1, further comprising utilizing, by the SDN application and the SDN switch an OpenFlow protocol.

13. A computing device configured to run a software defined network (SDN) application, the computing device being coupled in a network path between a client and a plurality of JAVA application server instances, and the SDN application being configured to:
   receive at least one remote JAVA application object request from the client;
   forward the at least one remote JAVA application object request to the plurality of JAVA application server instances;
   generate at least one remote JAVA application object pool based on object references received from the plurality of JAVA application server instances in response to the at least one remote JAVA application object request;
   return the at least one remote JAVA application object pool to the client;
   receive at least one remote JAVA application method invocation request from the client associated with the at least one remote JAVA application object request;
   delegate the at least one remote JAVA application method invocation request on stateless remote JAVA application object instances to one or more arbitrary JAVA application server instances in a load-balanced manner by:
      weighting the at least one remote JAVA application method invocation request; and
      delegating the at least one remote JAVA application method invocation request based on a measured load of the plurality of JAVA application server instances;
   send the at least one remote JAVA application method invocation request on stateful remote JAVA application object instances to requested JAVA application server instances; and
   retain at least one remote JAVA application object pool to accommodate the at least one remote JAVA application object request.

* * * * *